No. 774,815. PATENTED NOV. 15, 1904.
J. P. ANDERSON.
ELECTRIC INDICATING MECHANISM FOR PRESSURE GAGES.
APPLICATION FILED MAR. 16, 1903.
NO MODEL.

Witnesses

Inventor
James P. Anderson
by Geo. H. Hawkins
his Attorney.

No. 774,815.

Patented November 15, 1904.

UNITED STATES PATENT OFFICE.

JAMES P. ANDERSON, OF THE UNITED STATES NAVY.

ELECTRIC INDICATING MECHANISM FOR PRESSURE-GAGES.

SPECIFICATION forming part of Letters Patent No. 774,815, dated November 15, 1904.

Application filed March 16, 1903. Serial No. 147,983. (No model.)

*To all whom it may concern:*

Be it known that I, JAMES P. ANDERSON, a citizen of the United States, in the United States Navy, have invented certain new and useful Improvements in Electric Indicating Mechanism for Pressure-Gages, of which the following is a specification.

My invention relates to electric indicating mechanism for pressure-gages.

My object is the provision of an electric indicating mechanism of simple and improved construction whereby the indications of the needle or indicator on the pressure-gage will be accurately and instantaneously indicated electrically at any desired point.

In the practical application of the invention it is intended to be used in connection with a steam or air pressure gage; and my object is to provide in connection with the pressure-gage a resistance which will be increased or diminished by contact of the indicator or needle according to fluctuations of the pressure, said resistance being in circuit with a milliampere-meter whose needle acts in response to fluctuations in the current, the arrangement being such that the needle of the milliampere-meter will act synchronously with the needle or indicator of the pressure-gage and indicate on the graduations of the milliampere-meter the exact position of the needle of the pressure-gage. In this connection I desire it to be understood that the present invention comprehends the utilization of the fluctuations in the current occasioned by the cutting in and out of resistance by the pressure-gage needle to directly affect the needle of the milliampere-meter as contradistinguished from those electric gages where magnets are employed to actuate through some mechanical arrangement the needle of the meter.

Further objects are the provision of a novel form of combined needle and contact on the pressure-gage which is adapted to make the contact on the face of the gage and at the same time give direct reading of the indication.

The invention is set forth in detail hereinafter and the novel features recited in the appended claims.

Figure 1:
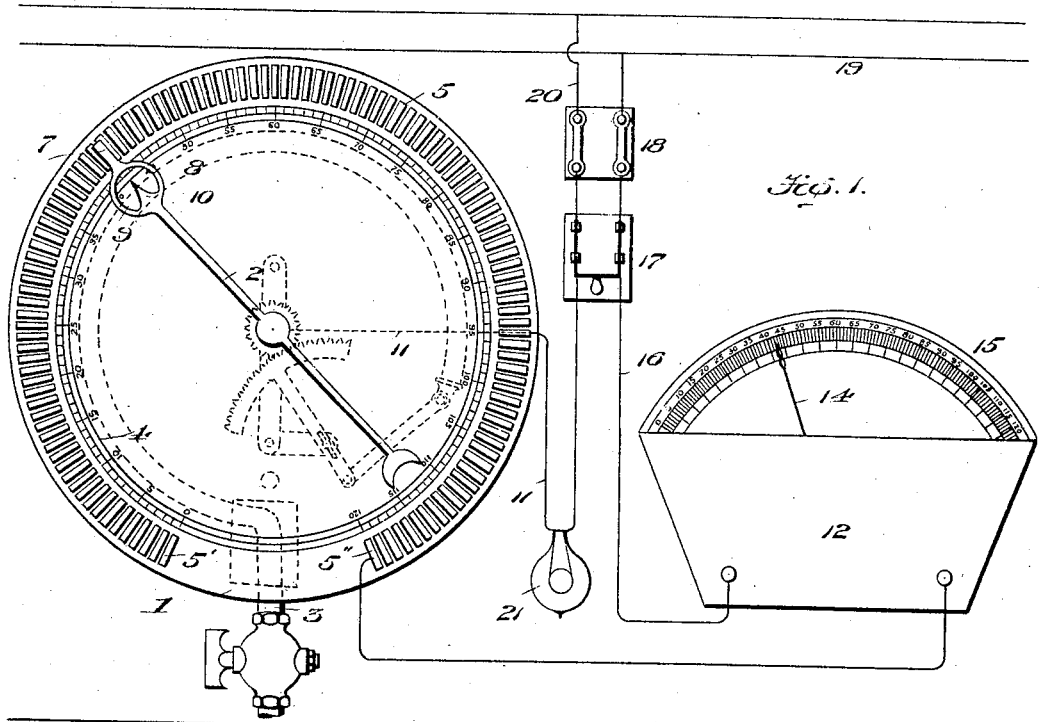
Figure 2:
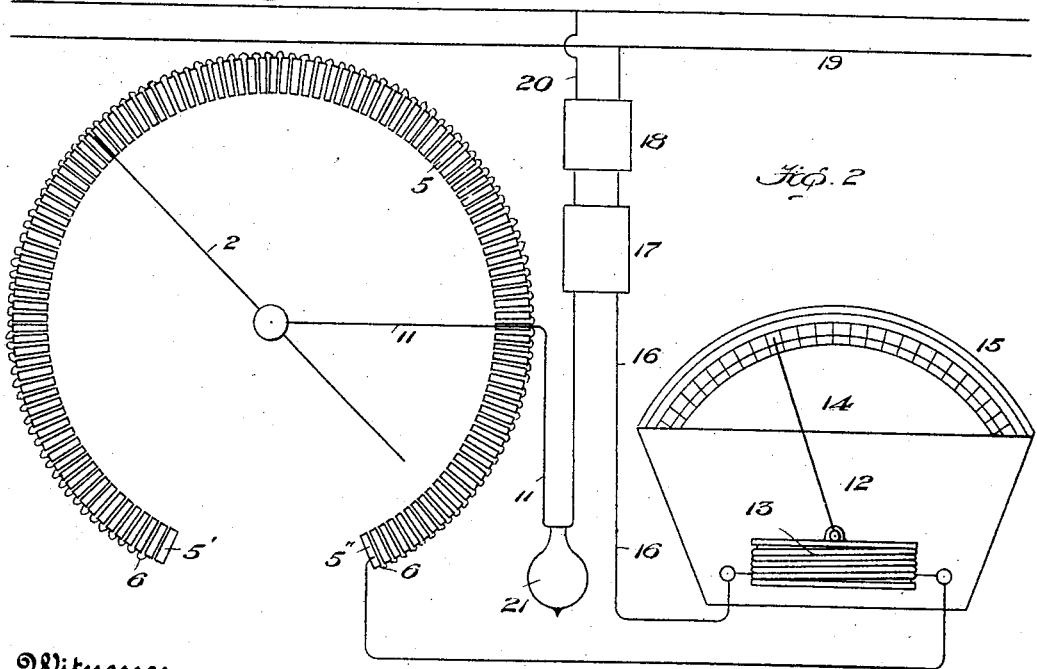

In the accompanying drawings, Figure 1 illustrates the invention generally, and Fig. 2 more particularly illustrates the circuit connections.

The steam, air, or other pressure gage 1 may be of ordinary construction and receive its pressure for actuation of its needle or indicator 2 through the pipe 3. This gage has the usual graduations 4 on its face arranged in a circle, and arranged concentrically with these graduations is the series of contact-plates 5, suitably insulated from the face of the gage, and each member is arranged radially in relation to the pivotal point of the needle 2, one contact member being provided for each degree or graduation. The first contact member 5', representing "zero," is dead; but beginning with the next contact member, 5, a series of resistances 6 is provided, all of said resistances being of equal resistance and joining adjacent contacts. The needle is provided with a straight contact tip or end 7, adapted to bear against the contacts 5 and only of sufficient width to bear on one contact or to bridge two adjacent contacts. The needle also has an enlarged or open ring portion 8, providing a peep-opening 9, into which projects the pointer 10 of the needle. The reading on the gage can therefore be directly had, while at the same time the needle serves as a contact-maker. From the last contact member 5" extends a circuit-wire 11, which connects with one binding-post of a milliampere-meter 12, of any preferred construction and having the coil 13, which through the fluctuations in the current controls the movement of the needle 14, which travels over the scale 15, said scale being graduated in correspondence to the scale or graduations of the gage. From the other binding-post of the milliampere-meter extends the circuit-wire 16, which leads to a double-pole knife-switch 17 and thence to a fuse-box 18 and to one feeder or lead of an ordinary feed-circuit 19. From the other wire of the lead 19 circuit-wire 20 extends to the fuse-box and thence to the knife-switch and to a thirty-two-candle-power incandescent lamp 21 and thence to the pivotal point of the needle 2. The fuse-box prevents injury to the instruments, and the switch permits throwing them out of circuit, while the lamp can serve as an illumination for the readings and also that the device is in working order. The resistance of the wires between the pressure-gage and the milliampere-meter has to be taken into consideration, and the milliampere-meter is in practice constructed so as to register its highest reading with a thousand feet of No. 14 wire, (Brown & Sharpe gage,) and if applied for use at shorter distances a wire with a correspondingly-increased resistance must be installed. The lamp 21 allows approximately one ampere to pass, thereby preventing sparking of the needle 2 on the contact-points.

Assuming that the gage is at zero and the contact portion 7 on the "dead" contact 5', as the needle 2 is moved around by the pressure the contact end 7 travels over the contact 5 and successively cuts out the resistance until when upon the last contact 5" all the resistance of the pressure-gage is cut out. As the resistances 6 are thus successively cut out the resistance of the circuit in which the milliampere-meter is included is lessened, and the needle 14 moves from left to right on the scale 15 in perfect synchronism with the movement of the needle 2 of the pressure-gage. Similarly as the needle 2 drops back on a decrease of the pressure more resistance will be cut in, and the needle 14 will drop back toward the zero of the scale 15 in synchronism with the needle 2. It will be understood that the milliampere-meter can be placed at any distance from the pressure-gage, so that the indication on the pressure-gage can be read wherever the milliampere-meter may be placed.

Having thus described my invention, what I claim as new, and desire to secure by Letters Patent, is—

1. In an electric indicating mechanism for electric gages, the combination with a pressure-gage having a scale, of a pressure-actuated pointer adapted to travel over said scale, a series of contacts corresponding to certain graduations of the scale and with which the pointer contacts as it travels over said scale, resistances connecting adjacent contacts which are cut in or out as the pointer moves, an electric indicator comprising a coil, a needle influenced by the coil, a scale corresponding to the scale of the pressure-gage and over which the needle is adapted to travel, and a circuit and source of current embracing the pointer and the coil and more or less of the resistances according to the position of the pointer, whereby the needle of the electrical indicator is made to move in synchronism with the pointer of the pressure-gage by the fluctuations of the current in the coil caused by cutting in and out of the resistances of the gage.

2. In an electric indicating mechanism for pressure-gages, the combination with a pressure-gage having a circularly-arranged scale, of a series of circularly-arranged contacts on the gage corresponding in number to the graduations of the scale, equal resistances connecting adjacent contacts, a pressure-actuated pivoted pointer adapted to indicate on the scale and also to make contact with the contacts successively, an electrical indicator having a circularly-arranged scale corresponding to the scale of the pressure-gage, and having a coil and a needle influenced directly by the fluctuations of the current in the coil, a circuit embracing the pointer and the coil of the electrical indicator and more or less of the resistances according to the position of the pointer, and an electric test-light in said circuit, whereby the needle of the electrical indicator moves in synchronism with the pointer of the pressure-gage and the test-light is continuously illuminated during the operation to continuously indicate that the circuit conditions are correct.

In testimony whereof I hereunto affix my signature in presence of two witnesses.

JAMES P. ANDERSON.

Witnesses:
D. K. STARBUCK,
MARIE HUSE KIDDER.